(12) United States Patent
Ye et al.

(10) Patent No.: US 8,255,864 B2
(45) Date of Patent: Aug. 28, 2012

(54) COMPUTING DEVICE AND METHOD FOR CHECKING SIGNAL TRANSMISSION LINES

(75) Inventors: Jia-Lu Ye, Shenzhen (CN); Shi-Piao Luo, Shenzhen (CN); Chia-Nan Pai, Taipei Hsien (TW); Shou-Kuo Hsu, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 24 days.

(21) Appl. No.: 12/961,908

(22) Filed: Dec. 7, 2010

(65) Prior Publication Data

US 2012/0030639 A1 Feb. 2, 2012

(30) Foreign Application Priority Data

Jul. 29, 2010 (CN) .......................... 2010 1 0240215

(51) Int. Cl.
*G06F 17/50* (2006.01)
(52) U.S. Cl. ......... 716/137; 716/126; 716/129; 716/130
(58) Field of Classification Search .......... 716/118–119, 716/122, 126, 129, 130, 132, 135, 137
See application file for complete search history.

(56) References Cited

U.S. PATENT DOCUMENTS

| | | | |
|---|---|---|---|
| 7,281,232 B1 * | 10/2007 | Nicolino et al. .............. 716/112 |
| 7,346,870 B2 * | 3/2008 | Du ................................ 716/112 |
| 7,559,045 B2 * | 7/2009 | Chen et al. ..................... 716/106 |
| 7,752,577 B1 * | 7/2010 | Gennari et al. ................ 716/122 |
| 7,814,453 B2 * | 10/2010 | Stevens et al. ................ 716/126 |
| 8,086,987 B1 * | 12/2011 | Wadland et al. .............. 716/126 |
| 2004/0010766 A1 * | 1/2004 | Swope ............................ 716/15 |
| 2006/0242614 A1 * | 10/2006 | Wadland et al. ................ 716/12 |
| 2007/0118823 A1 * | 5/2007 | Zhao et al. ........................ 716/5 |
| 2008/0235646 A1 * | 9/2008 | Petunin ............................ 716/15 |
| 2009/0249265 A1 * | 10/2009 | Arata ................................ 716/4 |
| 2010/0138802 A1 * | 6/2010 | Kobayashi ....................... 716/10 |
| 2010/0269080 A1 * | 10/2010 | Li et al. ............................ 716/6 |

* cited by examiner

*Primary Examiner* — Stacy Whitmore
(74) *Attorney, Agent, or Firm* — Altis Law Group, Inc.

(57) ABSTRACT

A computing device and a method selects a signal transmission line from a circuit board, computes an actual length of each line segment of the selected signal transmission line, and computes an actual distance between each line segment of the selected signal transmission line and a corresponding line segment of each neighboring signal transmission line. If each actual length is less than or equal to a corresponding reference length and each actual distance is more than or equal to a corresponding reference distance, the device and method determines a design of the selected signal transmission line satisfies the design standards. Otherwise, if any actual length is more than a corresponding reference length, or if any actual distance is less than a corresponding reference distance, the device and method determines the design of the signal transmission line does not satisfy the design standards.

15 Claims, 4 Drawing Sheets

COMPUTING DEVICE AND METHOD FOR CHECKING SIGNAL TRANSMISSION LINES

BACKGROUND

1. Technical Field

Embodiments of the present disclosure relates to circuit simulating systems and methods, and more particularly, to a computing device and a method for checking signal transmission lines of a circuit board.

2. Description of Related Art

A circuit board may be arranged with thousands of signal transmission lines. To ensure integrity of signals transmitted by the signal transmission lines, designs of the signal transmission lines should satisfy design standards. For example, a length of each line segment of a signal transmission line should satisfy a predetermined standard, so that each line segment of the signal transmission line has an appropriate impedance to ensure signal integrity. Spaces between neighboring signal transmission lines should also satisfy predetermined standards, to reduce crosstalk of the neighboring signal transmission lines. Therefore, it is necessary to incorporate design simulations and checks during the design and layout process of the circuit board. However, presently, obtaining information from a circuit board layout are often acquired manually. With the large quantity of signal transmission lines distributed on the circuit board, manual operation is not only time-consuming, but also error-prone.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
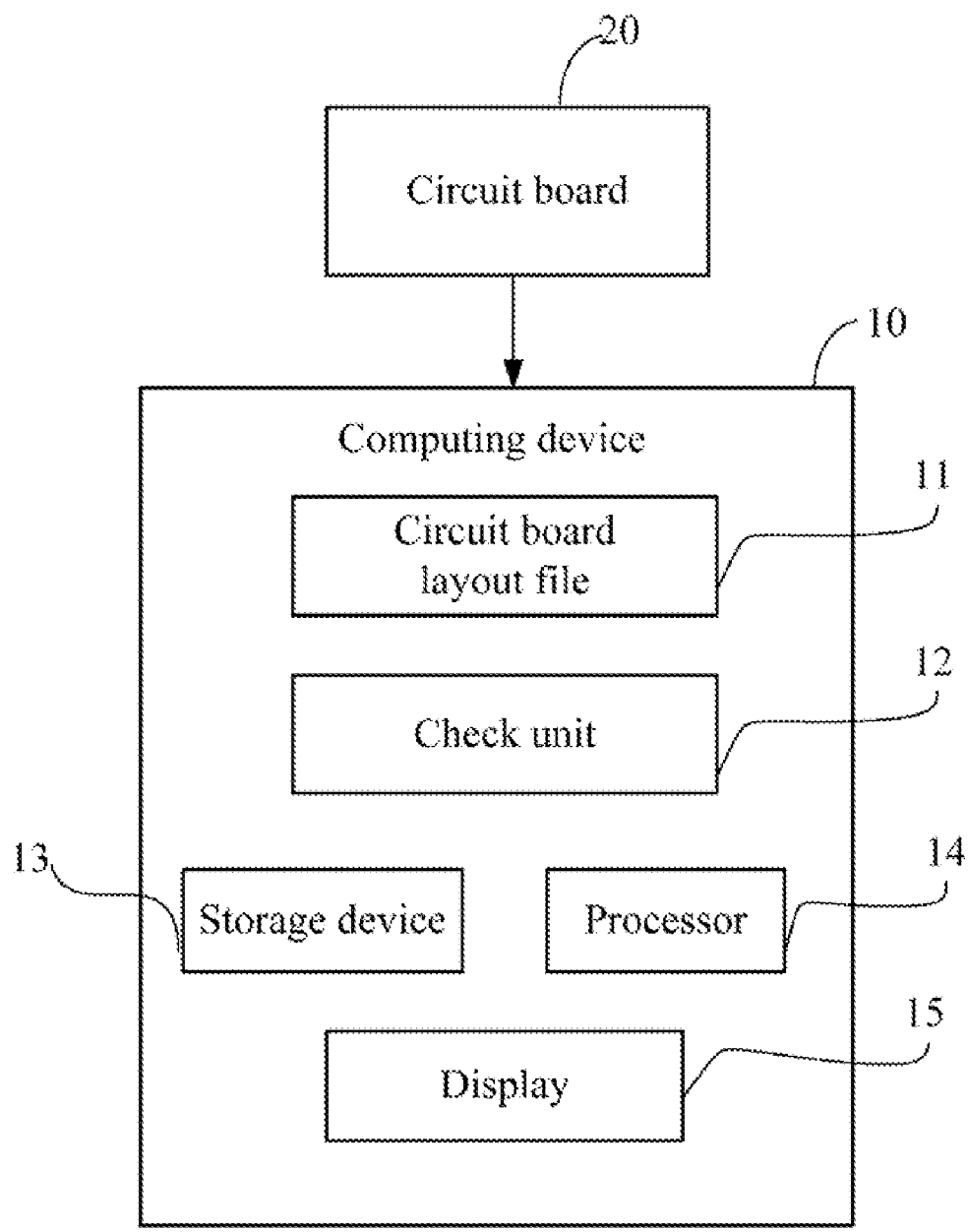
FIG. 1 is a block diagram of one embodiment of a computing device for checking signal transmission lines of a circuit board.

FIG. 1 is a block diagram of one embodiment of a computing device 10. The computing device 10 stores a circuit board layout file 11 of a circuit board 20. In this embodiment, the computing device 10 further includes a check unit 12, a storage device 13, a processor 14, and a display 15. The check unit 12 includes a number of function modules (detailed description is given in FIG. 2) The function modules may comprise computerized code in the form of one or more programs that are stored in the storage device 13. The computerized code includes instructions that are executed by the processor 14, to check information of the signal transmission lines, such as a length of each line segment of a signal transmission line, and spaces between neighboring signal transmission lines in the circuit board layout file 11. The circuit board layout file 11 can comprise one or more files detailing layout information of signal transmission lines and related components of one or more printed circuit boards.

The display 15 displays the circuit board layout file 11 and a user interface allowing selection of signal transmission lines to be checked and output check results. Depending on the embodiment, the storage device 13 may be a smart media card, a secure digital card, or a compact flash card. The computing device 10 may be a personal computer, or a server, for example.

Figure 2:
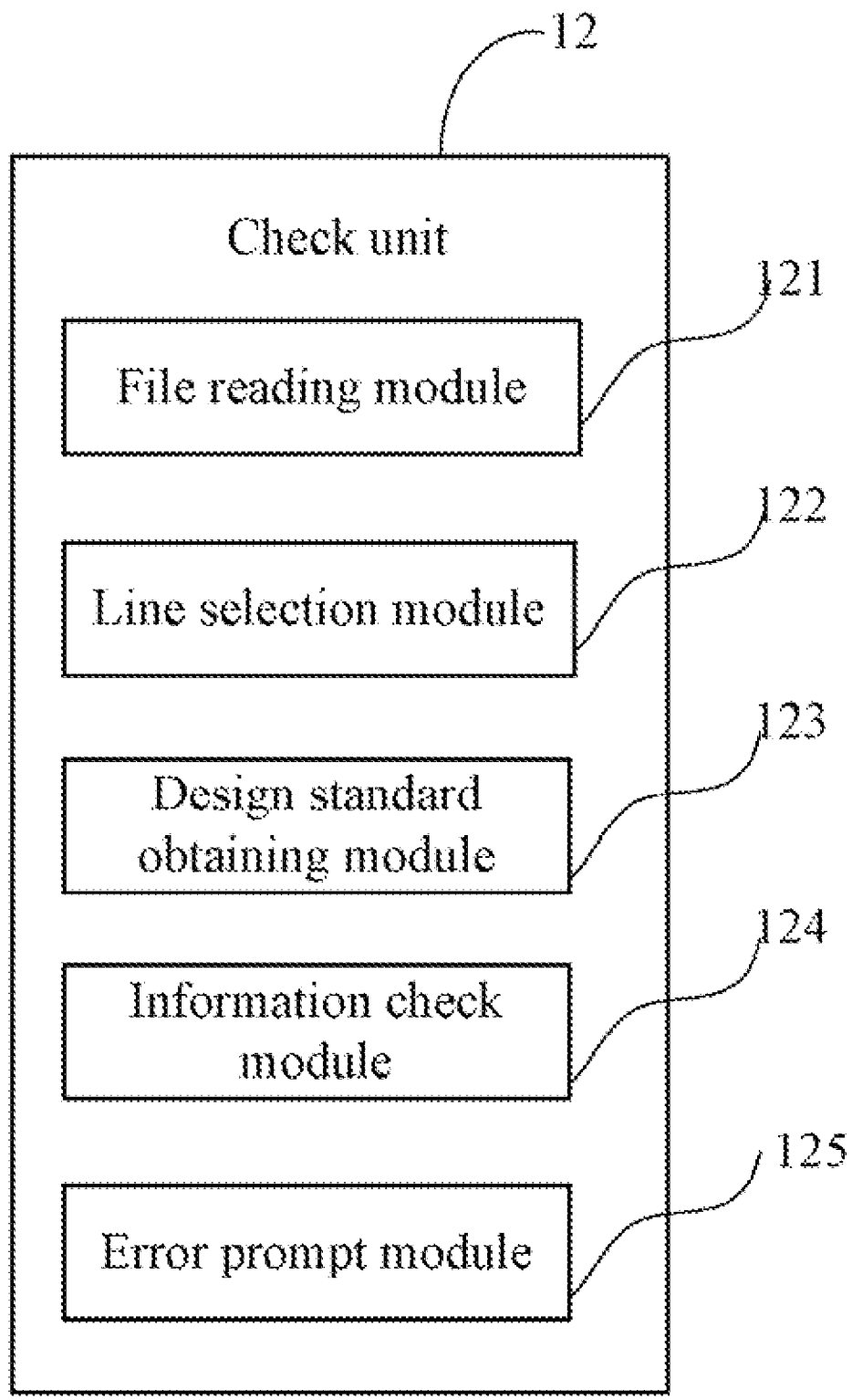
FIG. 2 is a block diagram of one embodiment of function modules of a check unit in the computing device of FIG. 1.

FIG. 2 is a block diagram of the function modules of the check unit 12 in the computing device 10 of FIG. 1. In one embodiment, the check unit 12 includes a file reading module 121, a line selection module 122, a design standard obtaining module 123, an information check module 124, and an error prompt module 125.

Figure 4:
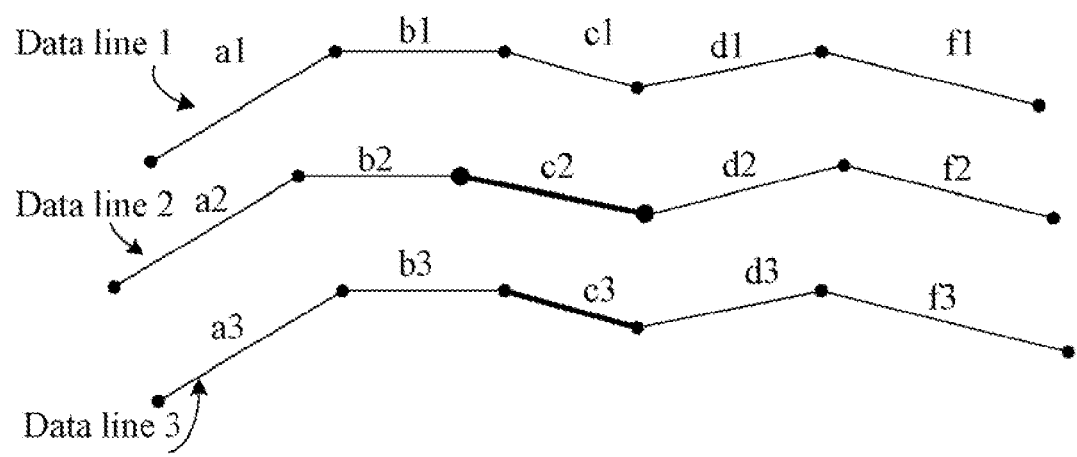
FIG. 4 is one embodiment of three signal transmission lines.

The file reading module 121 reads the circuit board layout file 11 from the storage device 13. In one embodiment, the circuit board layout file 11 includes design information of the signal transmission lines of the circuit board 10, such as the number of the signal transmission lines arranged on the circuit board 10, a length of each signal transmission line, and orientation of each signal transmission line. It is understood that a signal transmission line may include a number of line segments. For example, as shown in FIG. 4, data line 1 includes line segments "a1, b1, c1, d1, f1," data line 2 includes line segments "a2, b2, c2, d2, f2," and data line 3 includes line segments "a3, b3, c3, d3, f3."

The line selection module 122 receives one or more signal transmission lines selected by a user from the circuit board layout file 11. It is understood that the user can select one signal transmission line at one time, or select more than one signal transmission lines having the same design standards at one time. For example, in one embodiment, data line 1, data line 2, and data line 3 in FIG. 4 which have the same design standards may be selected at one time.

The design standard obtaining module 123 obtains design standards of the selected signal transmission lines from the storage device 13. In one embodiment, the design standards include a reference length of each line segment of a selected signal transmission line, and a reference distance between each line segment of the selected signal transmission line and a corresponding line segment of each neighboring signal transmission line. For example, in FIG. 4, reference lengths of the five line segments of each data line (i.e., data line 1, data line 2, or data line 3) are set as "150 mil, 80 mil, 75 mil, 100 mil, 200 mil," and reference distances between each line segment of a data line (e.g., data line 2) and a corresponding line segment of a neighboring data line (e.g., data line 1 or data line 3) are set as "4 mil, 6 mil, 8 mil, 10 mil, 9 mil."

The information check module 124 computes an actual length of each line segment of the selected signal transmission line, and computes an actual distance between each line segment of the selected signal transmission line and a corresponding line segment of each neighboring signal transmission line. For example, in one embodiment, actual lengths of the five line segments of data line 1 (e.g., a1, b1, c1, d1, f1) is "150 mil, 80 mil, 75 mil, 100 mil, 200 mil," actual lengths of the five line segments of data line 2 (e.g., a2, b2, c2, d2, f2) is "150 mil, 80 mil, 90 mil, 100 mil, 200 mil," and actual lengths of the five line segments of data line 3 (e.g., a3, b3, c3, d3, f3) is "150 mil, 80 mil, 73 mil, 100 mil, 200 mil." Furthermore, actual distances between each line segment of data line 2 and a corresponding line segment of data line 1 may be "4 mil, 6 mil, 8 mil, 10 mil, 9 mil," and actual distances between each line segment of data line 2 and a corresponding line segment of data line 3 may be "4 mil, 6 mil, 7.5 mil, 10 mil, 9 mil."

Furthermore, the information check module 124 checks if each actual length is less than or equal to the reference length of the line segment, and checks if each actual distance is more than or equal to a corresponding reference distance. If each actual length is less than or equal to a corresponding reference length, and each actual distance is more than or equal to a corresponding reference distance, the information check module 124 determines a design of the selected signal transmission line satisfies the design standards. Otherwise, if any actual length is more than a reference length, or if any actual distance is less than a corresponding reference distance, the information check module 124 determines the design of the signal transmission line does not satisfy the design standards.

For example, as mentioned above, reference lengths of the five line segments of each data line (e.g., data line 1, data line 2, or data line 3) in FIG. 4 are "150 mil, 80 mil, 75 mil, 100 mil, 200 mil," reference distances between each line segment of each data line (e.g., data line 2) and a corresponding line segment of a neighboring data line (e.g., data line 1 or data line 3) are "4 mil, 6 mil, 8 mil, 10 mil, 9 mil." Actual lengths of the five line segments of data line 1 is "150 mil, 80 mil, 75 mil, 100 mil, 200 mil," and actual distances between each line segment of data line 2 and a corresponding line segment of data line 1 is "4 mil, 6 mil, 8 mil, 10 mil, 9 mil." Accordingly, the information check module 124 determines a design of data line 1 satisfies the design standards. However, actual lengths of the five line segments of data line 2 is "150 mil, 80 mil, 90 mil, 100 mil, 200 mil," actual lengths of the five line segments of data line 3 is "150 mil, 80 mil, 73 mil, 100 mil, 200 mil," and actual distances between each line segment of data line 2 and a corresponding line segment of data line 3 is "4 mil, 6 mil, 7.5 mil, 10 mil, 9 mil." Therefore, the information check module 124 determines the design of the data line 2 and data line 3 does not satisfy the design standards.

The error prompt module 125 highlights the selected signal transmission lines which do not satisfy the design standards and displays unsatisfied reasons. For example, the error prompt module 125 may highlight data line 2 and data line 3 in the circuit board layout file 11 and displays unsatisfied reasons, such as the actual length of the third line segment of data line 2 is too long, and the actual distance between the third line segment of data line 2 and which the third line segment of data line 3 is too short.

Figure 3:
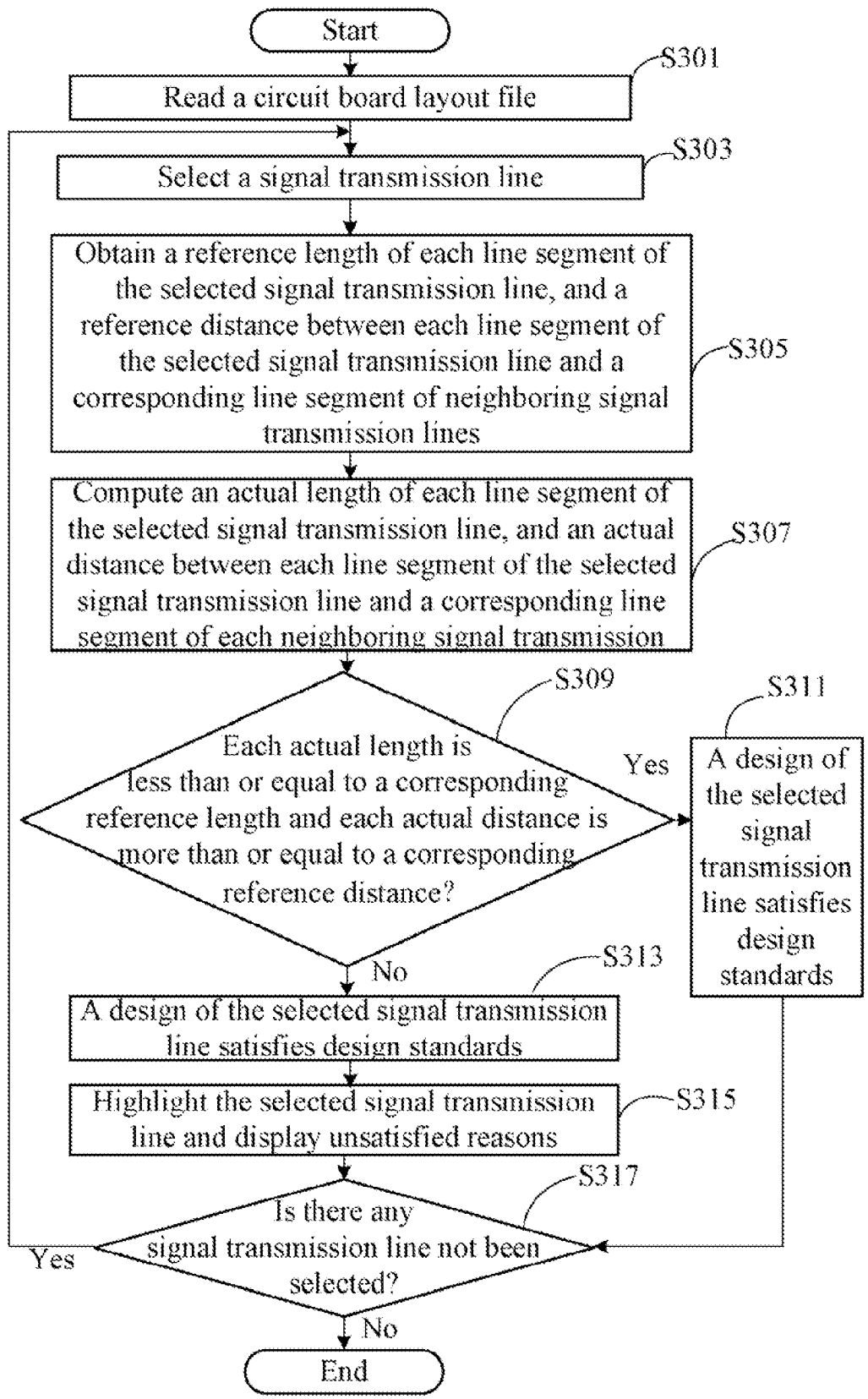
FIG. 3 is a flowchart of one embodiment of a method for checking signal transmission lines of a circuit board.

FIG. 3 is a flowchart of one embodiment of a method for checking signal transmission lines of the circuit board 20. Depending on the embodiment, additional blocks may be added, others removed, and the ordering of the blocks may be changed.

In block S301, the file reading module 121 reads the circuit board layout file 11 from the storage device 13. As mentioned above, the circuit board layout file 11 includes arrangement information of the signal transmission lines of the circuit board 20, such as the number of the signal transmission lines arranged on the circuit board 20, a length of each signal transmission line, and orientation of each signal transmission line.

In block S303, the line selection module 122 receives a signal transmission line selected by a user from the circuit board layout file 11. For example, in one embodiment, data line 2 shown in FIG. 4 is selected.

In block S305, the design standard obtaining module 123 obtains design standards of the selected signal transmission line from the storage device 13. As mentioned above, the design standards include a reference length of each line segment of the selected signal transmission line, and a reference distance between each line segment of the selected signal transmission line and a corresponding line segment of each neighboring signal transmission line. For example, in FIG. 4, reference lengths of the five line segments of data line 2 is set as "150 mil, 80 mil, 75 mil, 100 mil, 200 mil," and reference distances between each line segment of data line 2 and a corresponding line segment of each neighboring data line (e.g., data line 1 or data line 3) are set as "4 mil, 6 mil, 8 mil, 10 mil, 9 mil."

In block S307, the information check module 124 computes an actual length of each line segment of the selected signal transmission line, and computes an actual distance between each line segment of the selected signal transmission line and a corresponding line segment of each neighboring signal transmission line. For example, as mentioned above, actual lengths of the five line segments of data line 2 is "150 mil, 80 mil, 90 mil, 100 mil, 200 mil." Furthermore, actual distances between each line segment of data line 2 and a corresponding line segment of data line 1 is "4 mil, 6 mil, 8 mil, 10 mil, 9 mil," and actual distances between each line segment of data line 2 and a corresponding line segment of data line 3 is "4 mil, 6 mil, 7.5 mil, 10 mil, 9 mil."

In block S309, the information check module 124 checks if each actual length of the line segments of the selected signal transmission line is less than or equal to a corresponding reference length, and checks if each actual distance is more than or equal to a corresponding reference distance. If each actual length is less than or equal to a corresponding reference length, and each actual distance is more than or equal to a corresponding reference distance, the procedure goes to block S311, the information check module 124 determines a design of the selected signal transmission line satisfies the design standards. Then, the procedure goes to block S315.

Otherwise, if any actual length of the line segments of the selected signal transmission line is more than a reference length, or if any actual distance is less than a corresponding reference distance, the procedure goes to block S313 the information check module 124 determines the design of the signal transmission line does not satisfy the design standards. Then, the procedure goes to block S315.

In block S315, the error prompt module 125 highlights the selected signal transmission line in the circuit board layout file 11 and displays unsatisfied reasons. For example, the error prompt module 125 may highlight data line 2 in the circuit board layout file 11 and displays unsatisfied reasons, such as that the third line segment of data line 2 is too long, and the actual distance between the third line segment of data line 2 and the third line segment of data line 3 is too short.

In block S317, the information check module 124 checks if there is any signal transmission line that has not been selected in the circuit board layout file 11. If there is any signal transmission line that has not been selected in the circuit board layout file 11, the procedure returns to block S303. Otherwise, if all signal transmission lines in the circuit board layout file 11 have been selected, the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for checking signal transmission lines of a circuit board, the method comprising:
   reading a circuit board layout file from a storage device of a computing device, wherein the circuit board layout file comprises arrangement information of the signal transmission lines of the circuit board, and the arrangement information of the signal transmission lines comprises a number of the signal transmission lines arranged on the circuit board;
   selecting a signal transmission line from the circuit board layout file;
   obtaining design standards of the selected signal transmission line, wherein the design standards comprise a reference length of each line segment of the selected signal transmission line, and a reference distance between each line segment of the selected signal transmission line and a corresponding line segment of each neighboring signal transmission line;
   computing an actual length of each line segment of the selected signal transmission line, and computing an actual distance between each line segment of the selected signal transmission line and a corresponding line segment of each neighboring signal transmission line;
   determining a design of the selected signal transmission line satisfies the design standards, if each actual length of the line segments of the selected signal transmission line is less than or equal to a corresponding reference length and each actual distance of the selected signal transmission line and a neighboring signal transmission line is more than or equal to a corresponding reference distance, or determining the design of the selected signal transmission line does not satisfy the design standards, if any actual length is more than a corresponding reference length, or if any actual distance is less than a corresponding reference distance; and
   repeating from the selecting step until all signal transmission lines in the circuit board layout file have been checked.

2. The method as claimed in claim 1, further comprising:
   highlighting the selected signal transmission line in the circuit board layout file and displaying unsatisfied reasons, in response the determination that the design of the selected signal transmission line does not satisfy the design standards.

3. The method as claimed in claim 1, wherein the arrangement information of the signal transmission lines further comprises a length of each signal transmission line, and orientation of each signal transmission line.

4. The method as claimed in claim 1, wherein the computing device is a personal computer or a server.

5. The method as claimed in claim 1, wherein the storage device is selected from the group consisting of a smart media card, a secure digital card, and a compact flash card.

6. A computing device, comprising:
   a storage device;
   at least one processor; and
   a check unit comprising computerized code in the form of one or more programs, which are stored in the storage device and executable by the at least one processor, the one or more programs comprising:
   a file reading module operable to read a circuit board layout file from the storage device, wherein the circuit board layout file comprises arrangement information of signal transmission lines of a circuit board, and the arrangement information of the signal transmission lines comprises a number of the signal transmission lines arranged on the circuit board;
   a line selection module operable to select a signal transmission line to be checked from the circuit board layout file;
   a design standard obtaining module operable to obtain design standards of the selected signal transmission line, wherein the design standards comprise a reference length of each line segment of the selected signal transmission line, and a reference distance between each line segment of the selected signal transmission line and a corresponding line segment of each neighboring signal transmission line;
   an information check module operable to computing an actual length of each line segment of the selected signal transmission line, and computing an actual distance between each line segment of the selected signal transmission line and a corresponding line segment of each neighboring signal transmission line; and
   the information check module further operable to determine a design of the selected signal transmission line satisfies the design standards, if each actual length of the line segments of the selected signal transmission line is less than or equal to a corresponding reference length and each actual distance of the selected signal transmission line and a neighboring signal transmission line is more than or equal to a corresponding reference distance, or determine the design of the selected signal transmission line does not satisfy the design standards, if any actual length is more than a corresponding reference length or if any actual distance is less than a corresponding reference distance, and determine if any signal transmission line in the circuit board layout file has not been selected.

7. The computing device as claimed in claim 6, wherein the one or more programs further comprise an error prompt module operable to highlight the selected signal transmission line in the circuit board layout file and display unsatisfied reasons, in response the determination that the design of the selected signal transmission line does not satisfy the design standards.

8. The computing device as claimed in claim 6, wherein the arrangement information of the signal transmission lines further comprises a length of each signal transmission line, and orientation of each signal transmission line.

9. The computing device as claimed in claim 6, wherein the computing device is a personal computer or a server.

10. The computing device as claimed in claim 6, wherein the storage device is selected from the group consisting of a smart media card, a secure digital card, and a compact flash card.

11. A non-transitory computer readable medium storing a set of instructions, the set of instructions capable of being executed by a processor of a computing device to perform a method for checking signal transmission lines of a circuit board, the method comprising:
    reading a circuit board layout file from the medium, wherein the circuit board layout file comprises arrangement information of the signal transmission lines of a circuit board, and the arrangement information of the signal transmission lines comprises a number of the signal transmission lines arranged on the circuit board;
    selecting a signal transmission line to be checked from the circuit board layout file;

setting design standards of the selected signal transmission line, wherein the design standards comprise a reference length of each line segment of the selected signal transmission line, and a reference distance between each line segment of the selected signal transmission line and a corresponding line segment of each neighboring signal transmission line;

computing an actual length of each line segment of the selected signal transmission line, and computing an actual distance between each line segment of the selected signal transmission line and a corresponding line segment of each neighboring signal transmission line;

determining a design of the selected signal transmission line satisfies the design standards, if each actual length of the line segments of the selected signal transmission line is less than or equal to a corresponding reference length and each actual distance of the selected signal transmission line and a neighboring signal transmission line is more than or equal to a corresponding reference distance, or determining the design of the signal transmission line does not satisfy the design standards if any actual length is more than a corresponding reference length or if any actual distance is less than a corresponding reference distance; and repeating from the selecting step until all signal transmission lines in the circuit board layout file have been checked.

12. The medium as claimed in claim 11, wherein the method further comprises:

highlighting the selected signal transmission line in the circuit board layout file and displaying unsatisfied reasons, in response the determination that the design of the selected signal transmission line does not satisfy the design standards.

13. The medium as claimed in claim 11, wherein the arrangement information of the signal transmission lines further comprises a length of each signal transmission line, and orientation of each signal transmission line.

14. The medium as claimed in claim 11, wherein the computing device is a personal computer or a server.

15. The medium as claimed in claim 11, wherein the medium is selected from the group consisting of a smart media card, a secure digital card, and a compact flash card.

* * * * *